United States Patent
Li et al.

(10) Patent No.: US 11,620,678 B2
(45) Date of Patent: Apr. 4, 2023

(54) ADVERTISING METHOD, DEVICE AND SYSTEM, AND COMPUTER-READABLE STORAGE MEDIUM

(71) Applicant: Baidu Online Network Technology (Beijing) Co., Ltd., Beijing (CN)

(72) Inventors: Yongheng Li, Beijing (CN); Haibo Fu, Beijing (CN); Junwei Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 12 days.

(21) Appl. No.: 16/601,321

(22) Filed: Oct. 14, 2019

(65) Prior Publication Data
US 2020/0118168 A1 Apr. 16, 2020

(30) Foreign Application Priority Data
Oct. 16, 2018 (CN) .......................... 201811203844.0

(51) Int. Cl.
G06Q 30/00 (2012.01)
G06Q 30/0251 (2023.01)
(Continued)

(52) U.S. Cl.
CPC ..... G06Q 30/0261 (2013.01); G06Q 30/0244 (2013.01); G06Q 30/0246 (2013.01);
(Continued)

(58) Field of Classification Search
CPC .......... G06Q 30/0251; G06Q 30/0255; G06Q 30/0269; G06Q 30/0276; G06Q 30/0259; G06Q 30/0261
See application file for complete search history.

(56) References Cited

U.S. PATENT DOCUMENTS

| | | | | |
|---|---|---|---|---|
| 10,809,956 B1 * | 10/2020 | Bragdon | ................... | G06F 3/14 |
| 2008/0004953 A1 * | 1/2008 | Ma | ..................... | G06Q 30/0269 |
| | | | | 705/14.41 |
| 2009/0228357 A1 * | 9/2009 | Turakhia | ................ | G06Q 30/02 |
| | | | | 726/5 |

(Continued)

FOREIGN PATENT DOCUMENTS

| | | |
|---|---|---|
| CN | 105677844 A | 3/2017 |
| CN | 106506696 | 3/2017 |

(Continued)

OTHER PUBLICATIONS

Intel AIM Suite—Audience Impression Metrics, Jan. 4, 2021, AssuredSystemsUK (Year: 2012).*

(Continued)

*Primary Examiner* — Naresh Vig
(74) *Attorney, Agent, or Firm* — Knobbe, Martens, Olson & Bear, LLP

(57) ABSTRACT

An advertising method, device and system, and a computer-readable storage medium are provided. The method includes: acquiring user information; sending the user information to a server that stores an advertising requirement, wherein the advertising requirement includes an advertisement content and an advertising condition of the advertisement content; receiving an advertising instruction of the advertisement content from the server, wherein the advertising instruction of the advertisement content is generated by the server when the user information meets the advertising condition of the advertisement content; and playing the advertisement content in response to the advertising instruction.

17 Claims, 7 Drawing Sheets

(51) Int. Cl.
  *G06Q 30/0242* (2023.01)
  *G06Q 30/0241* (2023.01)
(52) U.S. Cl.
  CPC ..... *G06Q 30/0264* (2013.01); *G06Q 30/0269* (2013.01); *G06Q 30/0277* (2013.01)

(56) References Cited

U.S. PATENT DOCUMENTS

| | | | |
|---|---|---|---|
| 2010/0228632 A1* | 9/2010 | Rodriguez | G06F 3/0425 705/14.66 |
| 2014/0156398 A1* | 6/2014 | Li | G06K 9/00288 705/14.53 |
| 2015/0026708 A1* | 1/2015 | Ahmed | H04N 21/44218 725/12 |
| 2015/0127340 A1* | 5/2015 | Epshteyn | G09B 5/00 704/235 |
| 2017/0099988 A1* | 4/2017 | Matloubian | A47J 37/0664 |
| 2018/0365734 A1* | 12/2018 | Silva | G06Q 30/0267 |

FOREIGN PATENT DOCUMENTS

| | | |
|---|---|---|
| CN | 107220847 | 9/2017 |
| CN | 108197994 | 6/2018 |
| CN | 108230050 | 6/2018 |
| CN | 108269133 | 7/2018 |
| CN | 108460622 A | 8/2018 |
| CN | 108492140 | 9/2018 |
| CN | 108600297 | 9/2018 |

OTHER PUBLICATIONS

Brannon Dorsey, The Perils of Probe Requests, Jul. 30, 2017 (Year: 2017).*
Chinese Search Report of Sep. 21, 2020 for Chinese Patent Application No. 2018112037440, filed Oct. 16, 2018. 5 pages.
Chinese Office Action of Sep. 24, 2020 for Chinese Patent Application No. 2018112037440, filed Oct. 16, 2018. 7 pages.

* cited by examiner

ADVERTISING METHOD, DEVICE AND SYSTEM, AND COMPUTER-READABLE STORAGE MEDIUM

CROSS-REFERENCE TO RELATED APPLICATION

This application claims priority to Chinese patent application No. 201811203844.0, filed on Oct. 16, 2018, which is hereby incorporated by reference in its entirety.

TECHNICAL FIELD

The present application relates to a field of advertisement technology, and in particular, to an advertising method, device and system, and a computer-readable storage medium.

BACKGROUND

In traditional advertising techniques, advertisements may be continuously played during peak periods generally based on the statistical distribution of human traffic. However, it is not known whether the advertisements are watched by users, and the effect of advertising cannot be accurately measured, which leads to inaccurate optimization of advertising.

The above-mentioned information disclosed in the background is intended only to enhance the understanding of the context of the present application, and may therefore contain information that does not form an existing technology known to those skilled in the art.

SUMMARY

An advertising method, device and system, and a computer-readable storage medium are provided according to embodiments of the present application, so as to at least solve the above technical problems in the existing technology.

In a first aspect, an advertising method includes:
acquiring user information;
sending the user information to a server that stores an advertising requirement, wherein the advertising requirement includes an advertisement content and an advertising condition of the advertisement content;
receiving an advertising instruction of the advertisement content from the server, wherein the advertising instruction of the advertisement content is generated by the server when the user information meets the advertising condition of the advertisement content; and
playing the advertisement content in response to the advertising instruction.

In conjunction with the first aspect, in a first implementation of the first aspect of the present application, the acquiring user information includes:
acquiring user bioinformation, wherein the user bioinformation includes facial and physical features of a user; and
acquiring a network address to which a client device is linked, and acquiring user behavior information from the acquired network address.

In conjunction with the first aspect, in a second implementation of the first aspect of the present application, after playing the advertisement content in response to the advertising instruction, the advertising method further includes:
recording a playing time of the advertisement content, information about a user who views the advertisement content and a time of viewing the advertisement content in real time, and sending the recorded information to the server.

In a second aspect, an advertising method includes:
setting an advertising requirement including an advertisement content and an advertising condition of the advertisement content;
receiving user information from an advertisement playing apparatus;
generating an advertising instruction of the advertisement content when the user information meets the advertising condition of the advertisement content; and
sending the advertising instruction of the advertisement content to the advertisement playing apparatus to play the advertisement content.

In conjunction with the second aspect, in a first implementation of the second aspect of the present application, the setting an advertising requirement includes:
classifying the advertisement content according to a classification condition preset by an advertiser; and
setting the advertising condition of the advertisement content according to a classification of the advertisement content, wherein the advertising condition includes an advertising time period, an advertising region, and advertising customer information.

In conjunction with the second aspect, in a second implementation of the second aspect of the present application, the generating an advertising instruction of the advertisement content when the user information meets the advertising condition of the advertisement content includes:
determining whether the user information conforms with the advertising customer information; and
generating the advertising instruction of the advertisement content according to the advertising time period and the advertising region, in a case that the user information conforms with the advertising customer information.

In a third aspect, an advertising device includes:
a user information acquiring module, configured to acquire user information;
a user information sending module, configured to send the user information to a server that stores an advertising requirement, wherein the advertising requirement includes an advertisement content and an advertising condition of the advertisement content;
an advertising instruction receiving module, configured to receive an advertising instruction of the advertisement content from the server, wherein the advertising instruction of the advertisement content is generated by the server when the user information meets the advertising condition of the advertisement content; and
an advertisement playing module, configured to play the advertisement content in response to the advertising instruction.

In an implementation, the user information acquiring module includes:
a camera, configured to acquire user bioinformation, wherein the user bioinformation includes facial and physical features of a user; and
a wireless networking unit, configured to acquire a network address to which a client device is linked, and acquire user behavior information from the acquired network address.

In an implementation, the advertising device further includes:
an information recording module, configured to record a playing time of the advertisement content, information about a user who views the advertisement content and a time of viewing the advertisement content in real time, and to send the recorded information to the server.

In a fourth aspect, an advertising device includes:

an advertising requirement setting module, configured to set advertising requirement including advertisement content and an advertising condition of the advertisement content;

a user information receiving module, configured to receive user information from an advertisement playing apparatus;

an advertising instruction generating module, configured to generate an advertising instruction of the advertisement content when the user information meets the advertising condition of the advertisement content; and an advertising instruction sending module, configured to send the advertising instruction of the advertisement content to the advertisement playing apparatus to play the advertisement content.

In an implementation, the advertising requirement setting module includes:

an advertisement content classifying unit, configured to classify the advertisement content according to a classification condition preset by an advertiser; and an advertising condition setting unit, configured to set the advertising condition of the advertisement content according to a classification of the advertisement content, wherein the advertising condition includes an advertising time period, an advertising region, and advertising customer information.

In an implementation, the advertising instruction generating module includes:

an information matching determining unit, configured to determine whether the user information conforms with the advertising customer information; and an instruction generating unit, configured to generate the advertising instruction of the advertisement content according to the advertising time period and the advertising region, in a case that the user information conforms with the advertising customer information.

In a fifth aspect, an advertising system is provided according to an embodiment of the present application, including:

an advertisement playing apparatus, using the advertising device described in the third aspect;

a server, using the advertising device described in the fourth aspect.

In a sixth aspect, an advertising device is provided according to an embodiment of the present application, wherein the functions may be implemented by hardware, or by hardware executing corresponding software. The hardware or software includes one or more modules corresponding to the above functions.

In an implementation, the advertising device includes a processor and a storage, the storage is configured to store a program for supporting the above advertising method executed by the advertising device, and the processor is configured to execute the program stored in the storage. The advertising device further includes a communication interface configured for communication between the advertising device and another apparatus or communication network.

In a seventh aspect, a computer-readable storage medium is provided for storing computer software instructions used by the advertising device, the computer software instructions include programs involved in execution of the above advertising method.

One of the above technical solutions has the following advantages or beneficial effects: the advertisement can be pushed to the corresponding user effectively to ensure the user to view the corresponding advertisement, so that the promotion efficiency of advertisements can be improved. At the same time, different advertisements can be promoted according to different users, utilization rate of advertising budget and advertising effect can be improved. According to the analysis after advertising, the advertising mode may also be optimized.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

First Embodiment

Figure 1:
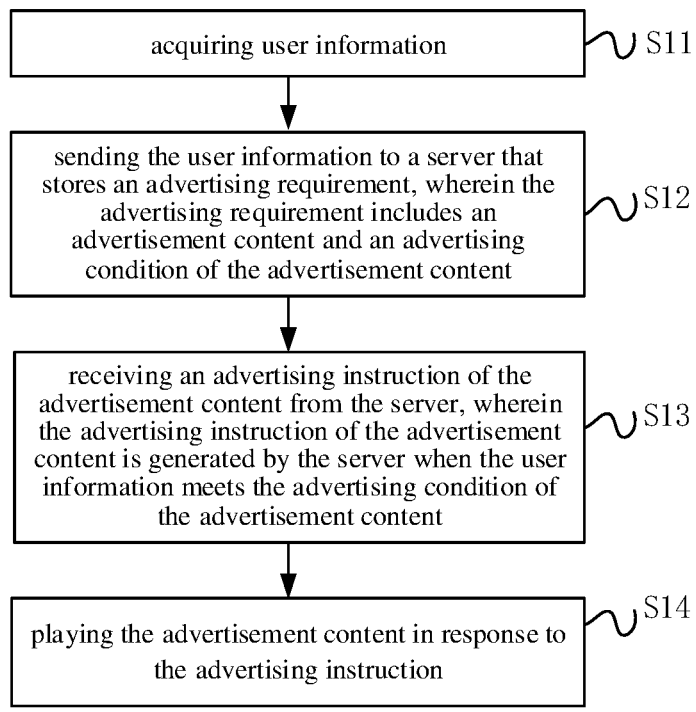
FIG. 1 is a flowchart of an advertising method according to a first embodiment of the present application.

As shown in FIG. 1, an advertising method according to an embodiment of the present application includes:

S11: acquiring user information;

S12: sending the user information to a server that stores an advertising requirement, wherein the advertising requirement includes an advertisement content and an advertising condition of the advertisement content;

S13: receiving an advertising instruction of the advertisement content from the server, wherein the advertising instruction of the advertisement content is generated by the server when the user information meets the advertising condition of the advertisement content; and S14: playing the advertisement content in response to the advertising instruction.

Firstly, an advertisement playing apparatus can monitor whether there is a user in front of an advertisement playing screen through a camera. If there is a user in front of the advertisement playing screen, it is determined whether the user's eyes are looking at the advertisement playing screen. If that the eyes of the user are looking at the advertisement playing screen, user information is acquired. The server storing a plurality of advertising requirements receives the user information sent from the advertisement playing apparatus. When the user information meets an advertising condition, an advertising instruction is generated. The generated advertising instruction is sent to the advertisement playing apparatus, so as to cause an advertisement content to be played.

The advertisement playing apparatus can be installed on household appliances, for example, a refrigerator, an air conditioner, a washing machine, and so on, thereby forming smart home appliances. When users use smart home appliances, they can view the corresponding advertisements simultaneously. The advertisement playing apparatus promotes different advertisements according to different users, so that the users can view the corresponding advertisements when using the home appliances. Not only the advertisements can be pushed to the corresponding users effectively, but also utilization rate of advertising budget and advertising effect can be improved. Also, the users can be ensured to view the corresponding advertisements, so that the promotion efficiency of advertisements can be improved.

Figure 2:
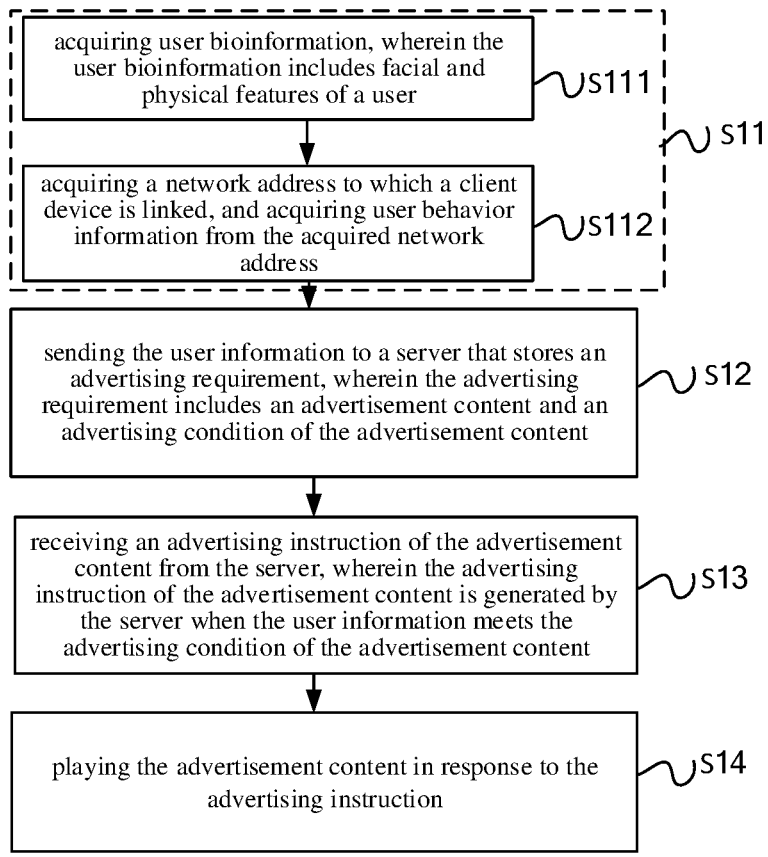
FIG. 2 is a flowchart of another advertising method according to a first embodiment of the present application.

In one embodiment, as shown in FIG. 2, S11 includes:

S111: acquiring user bioinformation, wherein the user bioinformation includes facial and physical features of a user;

S112: acquiring a network address to which a client device is linked, and acquiring user behavior information from the acquired network address.

The user information acquired in the S11 can be stored in a database for subsequent use. The acquired user information may be an attribute description for the user viewing the advertisement, such as the facial and physical features of the user, and the number of people in front of the screen. The user information can also be a specific location and/or a residence of the user. The user information may also be a network address to which a mobile client device (e. g, a mobile phone or an IPAD, etc.) being used by the user is linked, and the user's net surfing information obtained from the network address. Particularly, the facial features of the user can be captured by a face identification camera, and the physical features of the user can be captured by an infrared camera. Further, the user's age, gender, height, and so on can be obtained through analysis. Alternatively, the facial and physical features of the user can be identified by an artificial intelligence camera, and further, the user's age, gender, height, and so on can also be obtained through analysis. Through a wireless network apparatus, such as a Wireless Fidelity (WIFI) probe, the network address can also be obtained when the user is using a wireless network. Further, the content that the user frequently browses can be obtained, and the user behavior information can be obtained through analysis, such as, an advertisement content in which the user is interested, sites with higher click-through rates, a search history, and so on.

Figure 3:
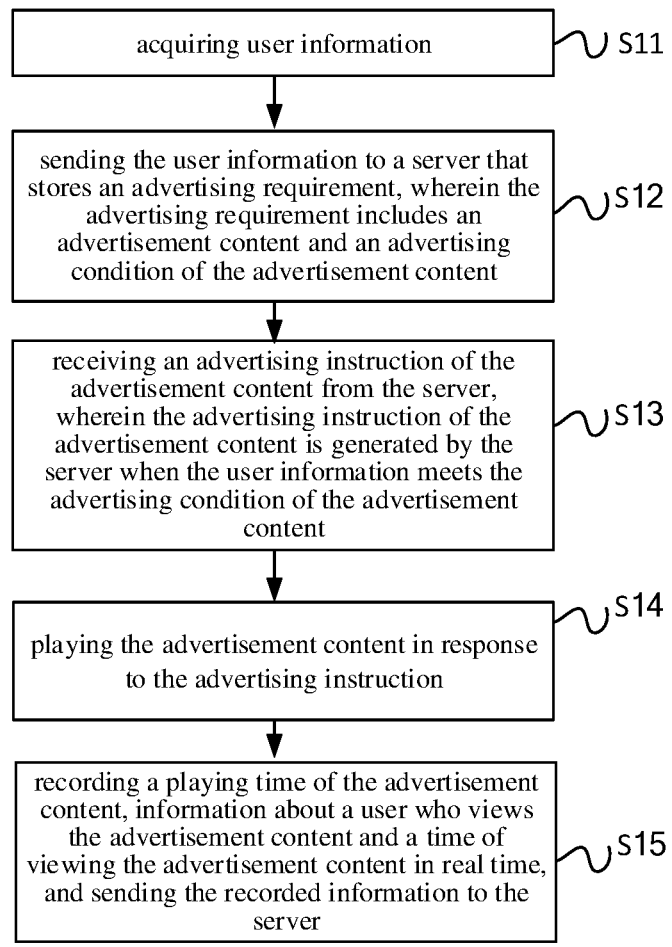
FIG. 3 is a flowchart of another advertising method according to a first embodiment of the present application.

In one embodiment, as shown in FIG. 3, the method further includes:

S15: recording a playing time of the advertisement content, information about a user who views the advertisement content and a time of viewing the advertisement content in real time, and sending the recorded information to the server.

Advertisers can clearly understand the advertisement playing effect and the audiences according to the advertising report, and thereby optimizing the advertising requirement. According to the analysis results obtained after advertising, the advertising mode may be optimized.

In a typical embodiment, a user described in the user information is a woman with an age of about 30, who views advertisements usually at 7:00 pm, and browses cooking information frequently, etc. The advertising conditions include the conditions such as the advertisement content of a cooking type, the advertising time period from 7:00 pm to 8:00 pm every night, the advertising day from Monday to Friday, and women with ages of 25 to 35. Therefore, the user information meets the above advertising conditions. And when a woman who meets the advertising conditions is in front of a refrigerator, an advertising instruction is generated to trigger the advertisement content about cooking, such as an advertisement content on how to cook a braised fish, or an advertisement content about a crab of a certain brand. After screening, it is found that 200,000 apparatuses equipped with the advertisement playing apparatuses are for use by women with ages of 20 to 30 who meet the advertising conditions, thus a corresponding advertisement content of a cooking type is pushed to the 200,000 apparatuses. After daily advertising, the information about viewing the advertisement is collected. For example, after an advertiser A's advertisement of a cooking type has been played, a report is provided as follows: "In August 2018, the advertisement was demonstrated 10010 times, with 8,000 viewers including 6,000 women and 2,000 men with an average age of 28, and an average viewing time of 6 s".

Second Embodiment

Figure 4:
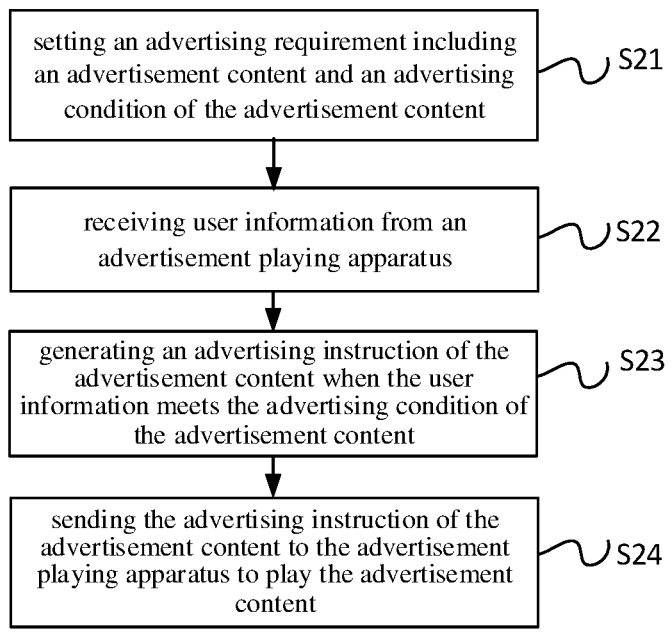
FIG. 4 is a flowchart of an advertising method according to a second embodiment of the present application.

As shown in FIG. 4, an advertising method is provided according to an embodiment of the present application, the method including:

S21: setting an advertising requirement including an advertisement content and an advertising condition of the advertisement content;

S22: receiving user information from an advertisement playing apparatus;

S23: generating an advertising instruction of the advertisement content when the user information meets the advertising condition of the advertisement content;

S24: sending the advertising instruction of the advertisement content to the advertisement playing apparatus to play the advertisement content.

In one example, each advertiser sets multiple advertising requirements according to their own promotional needs and stores them in a server. The advertising requirements include various promotional materials constituting the advertisement contents, and the promotional materials include texts, pictures, videos, audios, and so on. Advertising requirements also include multiple advertising conditions. For example, different advertisement contents correspond to different advertising dates, time periods for daily advertising, advertising regions, advertising business circles (such as within 1 km from Wangfujing), residential communities (such as a community in Huilongguan) for advertising, an age range of the population for advertising, gender requirements, crowd characteristics, and so on. It should be noted that if the user information meets the advertising conditions set by a plurality of different advertisers, revenues to be obtained after advertising are sorted, and the corresponding advertising instructions are generated in descending order of the revenues to play multiple advertisement contents in sequence.

Figure 5:
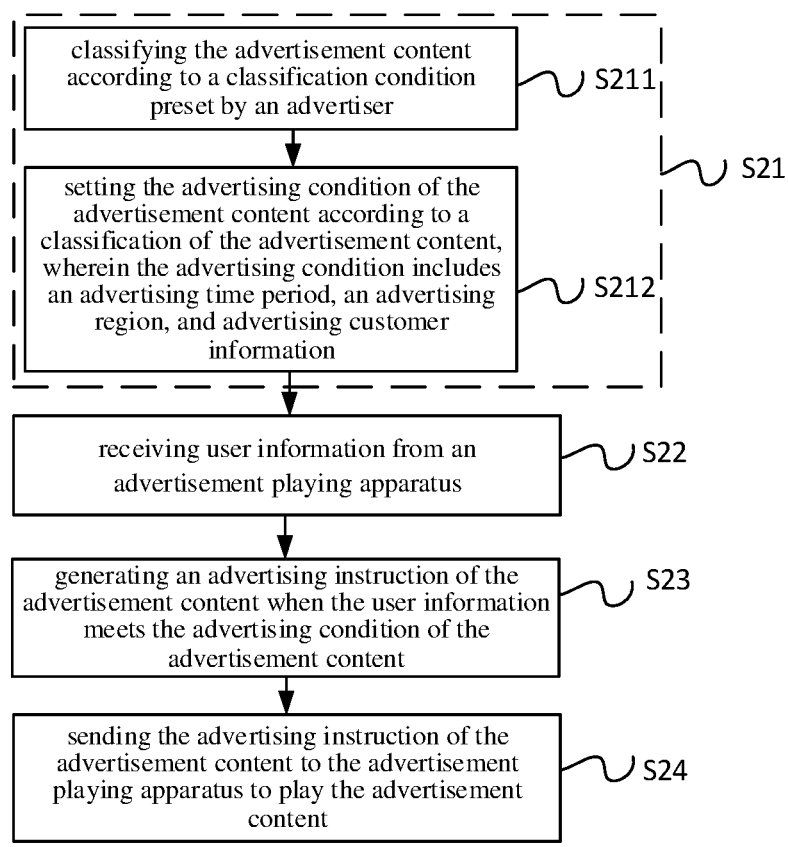
FIG. 5 is a flowchart of another advertising method according to a second embodiment of the present application.

In an embodiment, as shown in FIG. 5, S21 includes:

S211: classifying the advertisement content according to a classification condition preset by an advertiser;

S212: setting the advertising condition of the advertisement content according to a classification of the advertisement content, wherein the advertising condition includes an advertising time period, an advertising region, and advertising customer information.

Particularly, the advertisement content may be classified according to a carrier classification of the advertisement content. For example, the advertisement content may be divided into a picture type, a video type, etc. The advertisement content may also be classified according to a product classification. For example, the advertisement content may be classified into a food type, a clothing type, an automobile type, etc. The classification conditions include, but are not limited to, the above-mentioned contents, and other types of classification conditions, which may be adjusted according to different needs of the advertisers, are all within the protection scope of the present embodiment.

Different types of advertisement contents correspond to different advertising conditions. For example, an advertising time period for an advertisement content of a food type is preferably in every morning, noon, and evening. An advertising region for a clothing advertisement is best in all major business districts. The advertising may be adjusted according to requirements, so that the advertising is more accurate, thereby avoiding waste of advertisement playing.

Figure 6:
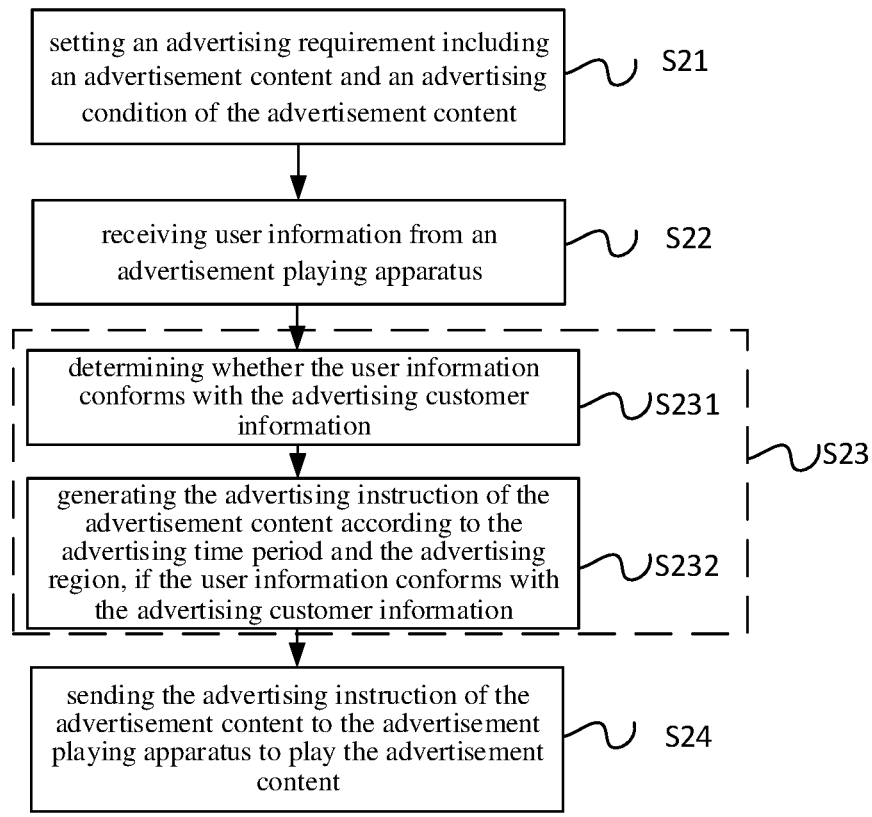
FIG. 6 is a flowchart of another advertising method according to a second embodiment of the present application.

In an embodiment, as shown in FIG. 6, S23 includes:

S231: determining whether the user information conforms with the advertising customer information;

S232: generating the advertising instruction of the advertisement content according to the advertising time period and the advertising region, in a case that the user information conforms with the advertising customer information.

In one example, the user described in the acquired user information is a woman with an age of about 30, and the user conforms with the advertising customer information such as women with ages of 25 to 35. In a case of matching, an advertisement content of a food type or an advertisement content of a cooking type can be chosen to be presented in the morning, noon and evening, and an advertisement content of a clothing type is chosen to be presented in the morning and afternoon.

Third Embodiment

Figure 7:
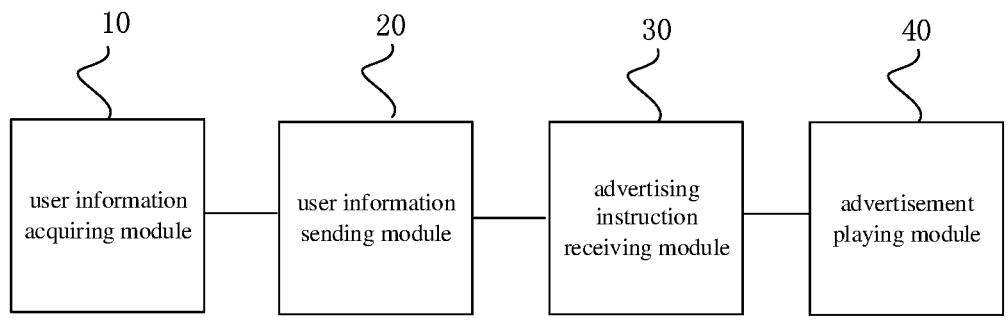
FIG. 7 is a schematic structural diagram of an advertising device according to a first embodiment of the present application.

As shown in FIG. 7, an advertising device is provided according to an embodiment of the present application, the advertising device including:

a user information acquiring module 10 configured to acquire user information;

a user information sending module 20 configured to send the user information to a server that stores an advertising requirement, wherein the advertising requirement includes an advertisement content and an advertising condition of the advertisement content;

an advertising instruction receiving module 30 configured to receive an advertising instruction of the advertisement content from the server, wherein the advertising instruction of the advertisement content is generated by the server when the user information meets the advertising condition of the advertisement content; and an advertisement playing module 40 configured to play the advertisement content in response to the advertising instruction.

In an example, the provided advertising device may be disposed in the advertisement playing apparatus in the second embodiment to constitute an advertisement playing apparatus.

Figure 8:
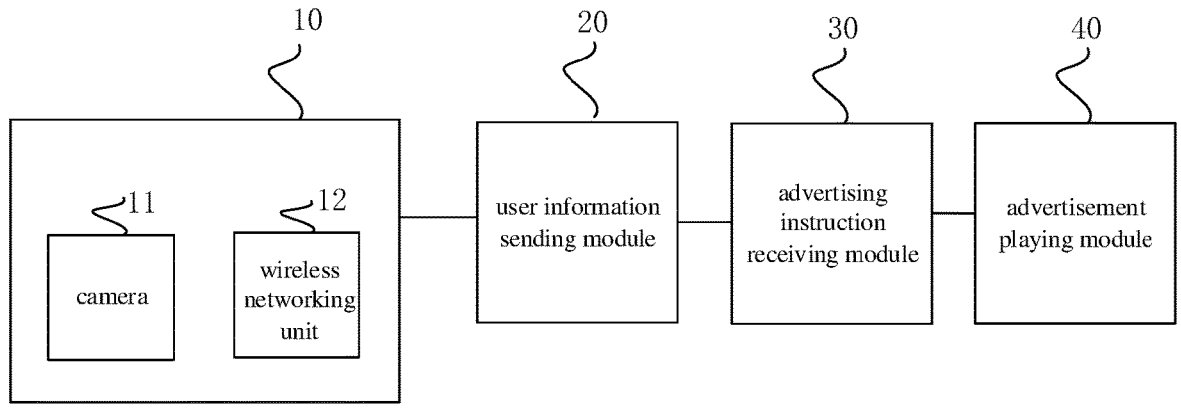
FIG. 8 is a schematic structural diagram of another advertising device according to a first embodiment of the present application.

In an implementation, as shown in FIG. 8, the user information acquiring module includes:

a camera 11 configured to acquire user bioinformation, wherein the user bioinformation includes facial and physical features of a user; and a wireless networking unit 12 configured to acquire a network address to which a client device is linked, and acquire user behavior information from the acquired network address.

Figure 9:
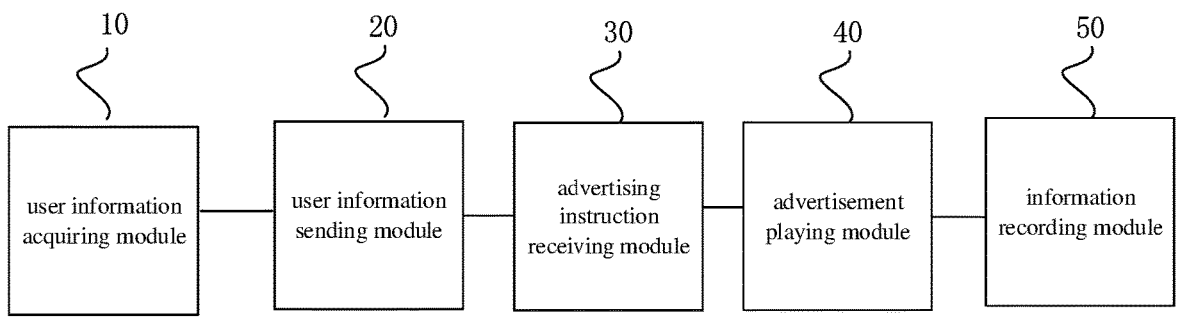
FIG. 9 is a schematic structural diagram of another advertising device according to a first embodiment of the present application.

In an implementation, as shown in FIG. 9, the advertising device further includes:

an information recording module 50 configured to record a playing time of the advertisement content, information about a user who views the advertisement content and a time of viewing the advertisement content in real time, and to send the recorded information to the server.

Fourth Embodiment

Figure 10:
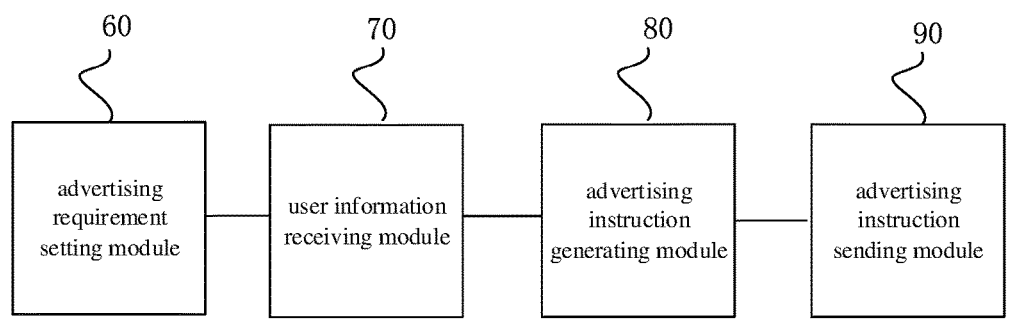
FIG. 10 is a schematic structural diagram of an advertising device according to a second embodiment of the present application.

As shown in FIG. 10, an advertising device is provided according to another embodiment of the present application, the advertising device including:

an advertising requirement setting module 60 configured to set an advertising requirement including an advertisement content and an advertising condition of the advertisement content;

a user information receiving module 70 configured to receive user information from an advertisement playing apparatus;

an advertising instruction generating module 80 configured to generate an advertising instruction of the advertisement content when the user information meets the advertising condition of the advertisement content; and an advertising instruction sending module 90 configured to send the advertising instruction of the advertisement content to the advertisement playing apparatus to play the advertisement content.

Figure 11:
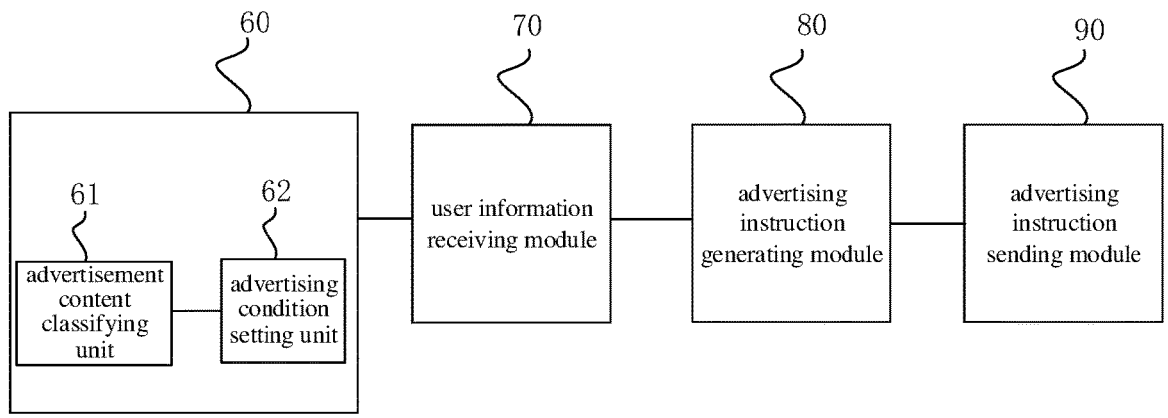
FIG. 11 is a schematic structural diagram of another advertising device according to a second embodiment of the present application.

In an implementation, as shown in FIG. 11, the advertising requirement setting module 60 includes:

an advertisement content classifying unit 61 configured to classify the advertisement content according to a classification condition preset by an advertiser; and an advertising condition setting unit 62 configured to set the advertising condition of the advertisement content according to a classification of the advertisement content, wherein the advertising condition includes an advertising time period, an advertising region, and advertising customer information.

In an example, the provided advertising device may be the server in the first embodiment, and the server may be a platform capable of storing data and processing data, such as a cloud platform.

Figure 12:
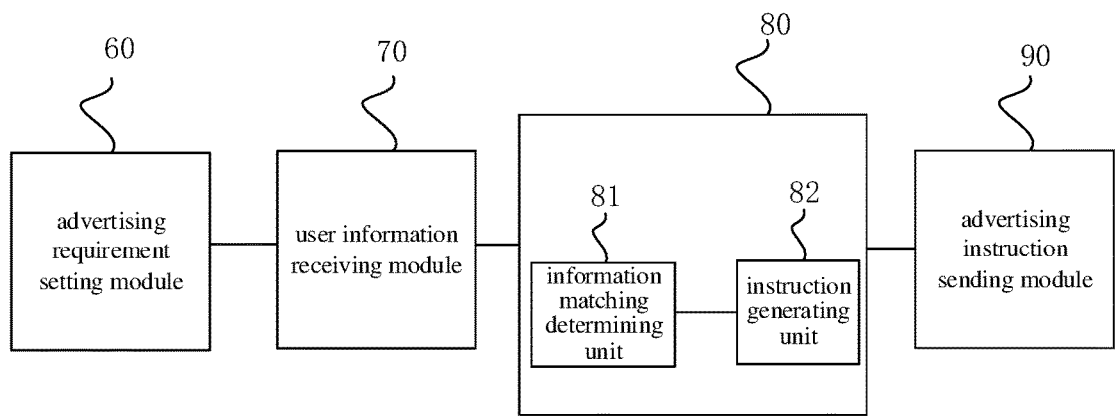
FIG. 12 is a schematic structural diagram of another advertising device according to a second embodiment of the present application.

In an implementation, as shown in FIG. 12, the advertising instruction generating module 80 includes:

an information matching determining unit 81 configured to determine whether the user information conforms with the advertising customer information; and an instruction generating unit 82 configured to generate the advertising instruction of the advertisement content according to the advertising time period and the advertising region, in a case that the user information conforms with the advertising customer information.

Fifth Embodiment

Figure 13:
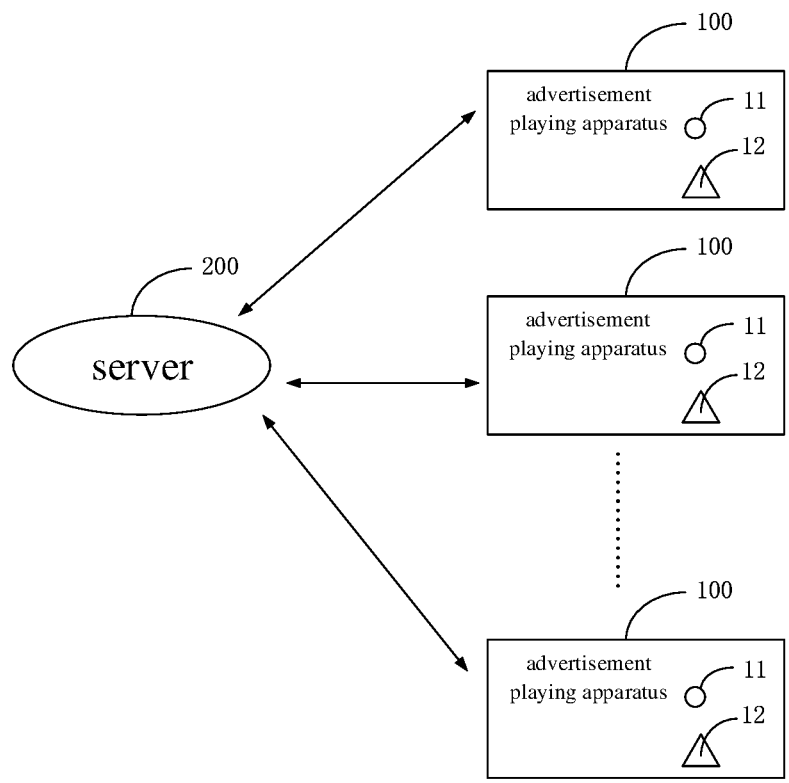
FIG. 13 is a schematic structural diagram of an advertising system according to an embodiment of the present application.

FIG. 13 is a schematic structural diagram of an advertising system according to an embodiment of the present application. The advertising system includes:

an advertisement playing apparatus 100 using the advertising device in the third embodiment;

an server 200 using the advertising device in the fourth embodiment.

Sixth Embodiment

Figure 14:
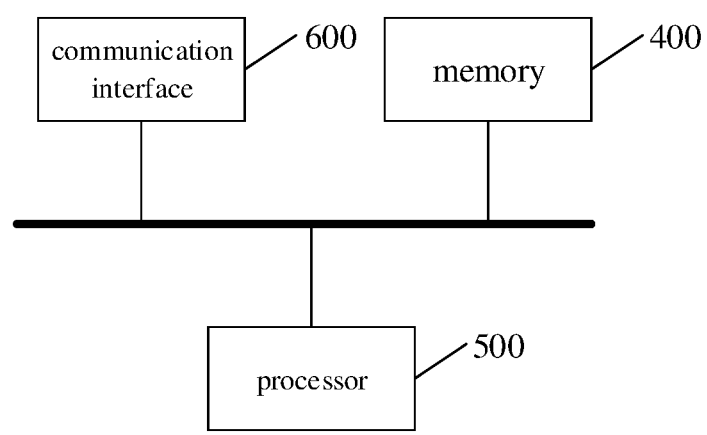
FIG. 14 is a schematic structural diagram of an advertising device according to an embodiment of the present application.

As shown in FIG. 14, an advertising device is provided according to an embodiment of the present application, including: a memory 400 and a processor 500. The memory 400 stores a computer program executable on the processor 500. When the processor 500 executes the computer program, the advertising method in the foregoing embodiment is implemented. The number of the memory 400 and the processor 500 may be one or more.

The advertising device further includes:

a communication interface 600, via which the memory 400 and the processor 500 communicate with an external device.

The memory 400 may include a high-speed RAM memory and may also include a non-volatile memory, such as at least one magnetic disk memory.

If the memory 400, the processor 500, and the communication interface 600 are implemented independently, the memory 400, the processor 500, and the communication interface 600 may be connected to each other through a bus and communicate with one another. The bus may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and the like. For ease of illustration, only one bold line is shown in FIG. 14, but it does not mean that there is only one bus or one type of bus.

Optionally, in a specific implementation, if the memory 400, the processor 500, and the communication interface 600 are integrated on one chip, the memory 400, the processor 500, and the communication interface 600 may implement mutual communication through an internal interface.

Seventh Embodiment

According to an embodiment of the present application, a computer-readable storage medium is provided for storing computer software instructions, which include programs involved in execution of the above advertising method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality or means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for playing content on a smart home appliance, implemented by a smart home appliance processor for implementing functions, comprising:
    acquiring user information, wherein the user information comprises a network address to which a client device being used by a user is linked, and the network address is acquired by a network apparatus;
    acquiring user behavior information based on the acquired network address, wherein the user behavior information comprises a content in which the user is interested, sites with higher click-through rates, and a search history;
    sending the user information and the user behavior information to a server implemented by circuits that stores a playing requirement, wherein the playing requirement comprises a playing content and a playing condition of the playing content;
    receiving a playing instruction of the playing content from the server implemented by circuits, wherein the playing instruction of the playing content is generated by the server in response to the user information and the user behavior information meeting the playing condition of the playing content; and
    playing the playing content in response to the playing instruction, the playing content comprises at least one of audio, video, picture and text.

2. The playing method according to claim 1, wherein the network apparatus is a wireless communication (WiFi) probe.

3. The playing method according to claim 1, wherein the acquiring user information comprises:
    acquiring user bioinformation, wherein the user bioinformation comprises facial and physical features of a user.

4. The playing method according to claim 3, wherein acquiring the user bioinformation comprises acquiring the bioinformation via an artificial intelligence camera of a client device.

5. The playing method according to claim 1, wherein after playing the playing content in response to the playing instruction, the method further comprises:
    recording a playing time of the playing content, information about a user who views the playing content and a time of viewing the playing content in real time, and sending the recorded information to the server.

6. A playing method for playing content on a smart home appliance, implemented by a smart home appliance processor for implementing functions, comprising:
    setting a playing requirement comprising a playing content and a playing condition of the playing content;
    receiving user information and user behavior information from a content playing apparatus, wherein the user information comprises a network address to which a client device being used by a user is linked, and the network address is acquired by a network apparatus, and the user behavior information is acquired based on the acquired network address and comprises a content in which the user is interested, sites with higher click-through rates, and a search history;
    generating a playing instruction of the playing content in response to the user information meeting the playing condition of the playing content; and
    sending the playing instruction of the playing content to the content playing apparatus to play the playing content, the playing content comprises at least one of audio, video, picture and text.

7. The playing method according to claim 6, wherein the setting a playing requirement comprises:
    classifying the playing content according to a preset classification condition; and
    setting the playing condition of the playing content according to a classification of the playing content, wherein the playing condition comprises a playing time period, a playing region, and target customer information.

8. The playing method according to claim 7, wherein the generating a playing instruction of the playing content in response to the user information meeting the playing condition of the playing content comprises:
    determining whether the user information conforms with the target customer information; and
    generating the playing instruction of the playing content according to the playing time period and the playing region, in response to the user information conforming with the target customer information.

9. An electronic device for playing content on a smart home appliance, implemented by a smart home appliance processor for implementing functions, comprising:

one or more processors; and a storage device configured to store one or more programs, that, when executed by the one or more processors, cause the one or more processors to:

acquire user information, wherein the user information comprises a network address to which a client device being used by a user is linked, and the network address is acquired by a network apparatus;

acquire user behavior information based on the acquired network address, wherein the user behavior information comprises a content in which the user is interested, sites with higher click-through rates, and a search history;

send the user information to a server implemented by circuits that stores a playing requirement, wherein the playing requirement comprises a playing content and a playing condition of the playing content;

receive a playing instruction of the playing content from the server implemented by circuits, wherein the playing instruction of the playing content from is generated by the server in response to the user information meeting the playing condition of the playing content; and play the playing content in response to the playing instruction, the playing content comprises at least one of audio, video, picture and text.

10. The electronic device according to claim 9, wherein the one or more programs, when executed by the one or more processors, cause the one or more processors further to:

acquire user bioinformation, wherein the user bioinformation comprises facial and physical features of a user.

11. The electronic device according to claim 9, wherein the one or more programs, when executed by the one or more processors, cause the one or more processors further to:

record a playing time of the playing content, information about a user who views the playing content and a time of viewing the playing content in real time, and send the recorded information to the server.

12. An electronic device for playing content on a smart home appliance, implemented by a smart home appliance processor for implementing functions, comprising:

one or more processors; and a storage device configured to store one or more programs, that, when executed by the one or more processors, cause the one or more processors to:

set a playing requirement comprising a playing content and a playing condition of the playing content;

receive user information and user behavior information from a content playing apparatus, wherein the user information comprises a network address to which a client device being used by a user is linked, and the network address is acquired by a network apparatus, and the user behavior information is acquired based on the acquired network address and comprises a content in which the user is interested, sites with higher click-through rates, and a search history;

generate a playing instruction of the playing content in response to the user information meeting the playing condition of the playing content; and send the playing instruction of the playing content to the content playing apparatus to play the playing content, the playing content comprises at least one of audio, video, picture and text.

13. The electronic device according to claim 12, wherein the one or more programs, when executed by the one or more processors, cause the one or more processors further to:

classify the playing content according to a preset classification condition; and set the corresponding playing condition of the playing content according to a classification of the playing content, wherein the playing condition comprises a playing time period, a playing region, and target customer information.

14. The electronic device according to claim 12, wherein the one or more programs, when executed by the one or more processors, cause the one or more processors further to:

determine whether the user information conforms with the target customer information; and generate the playing instruction of the playing content according to the playing time period and the playing region, in response to the user information conforming with the target customer information.

15. A non-transitory computer-readable storage medium, in which a computer program is stored, wherein the computer program, when executed by a processor, causes the processor to implement the method of claim 1.

16. A non-transitory computer-readable storage medium, in which a computer program is stored, wherein the computer program, when executed by a processor, causes the processor to implement the method of claim 6.

17. The playing method according to claim 4, wherein the method further comprises: determining the user's age, gender, and height based on an analysis of the facial and physical features of the user, wherein the playing instruction of the playing content is generated by the server further in response to the bioinformation.

\* \* \* \* \*